(12) United States Patent
Arndt

(10) Patent No.: US 6,892,383 B1
(45) Date of Patent: May 10, 2005

(54) HYPERVISOR FUNCTION SETS

(75) Inventor: Richard Louis Arndt, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 946 days.

(21) Appl. No.: 09/589,662

(22) Filed: Jun. 8, 2000

(51) Int. Cl.$^7$ .......................... G06F 9/455; G06F 12/00
(52) U.S. Cl. ................. 718/1; 711/6; 711/203
(58) Field of Search ............................ 718/1, 100–108; 711/1–6, 100–173, 200–211

(56) References Cited

U.S. PATENT DOCUMENTS

| | | | |
|---|---|---|---|
| 5,276,884 A | * | 1/1994 | Mohan et al. ............... 711/163 |
| 5,437,033 A | * | 7/1995 | Inoue et al. .................. 714/10 |
| 5,996,026 A | * | 11/1999 | Onodera et al. ............... 710/3 |
| 6,260,068 B1 | | 7/2001 | Zalewski et al. ........... 709/226 |
| 2002/0016891 A1 | | 2/2002 | Noel et al. .................. 711/153 |
| 2002/0016892 A1 | * | 2/2002 | Zalewski et al. ........... 711/153 |

* cited by examiner

Primary Examiner—Meng-Al T. An
Assistant Examiner—Kenneth Tang
(74) Attorney, Agent, or Firm—Duke W. Yee; Mark E. McBurney; Lisa L. B. Yociss

(57) ABSTRACT

A method, system, and apparatus for informing a plurality of operating systems, each assigned to a separate partition within a logically partitioned data processing system, of which functions, provided by a hypervisor for creating and enforcing separation of the logical partitions, are available for use by the operating systems is provided. In a preferred embodiment, the hypervisor includes a plurality of function sets. Each function set includes a list of functions that may be called by any one of the operating systems to perform tasks for the operating systems while maintaining separation between each of the logical partitions. The hypervisor informs each of the plurality of operating systems of an enabled function set. Functions identified within the enabled function set are enabled for use by each of the plurality of operating systems and functions not identified within the enabled function set are disabled for use by each of the plurality of operating systems.

24 Claims, 5 Drawing Sheets

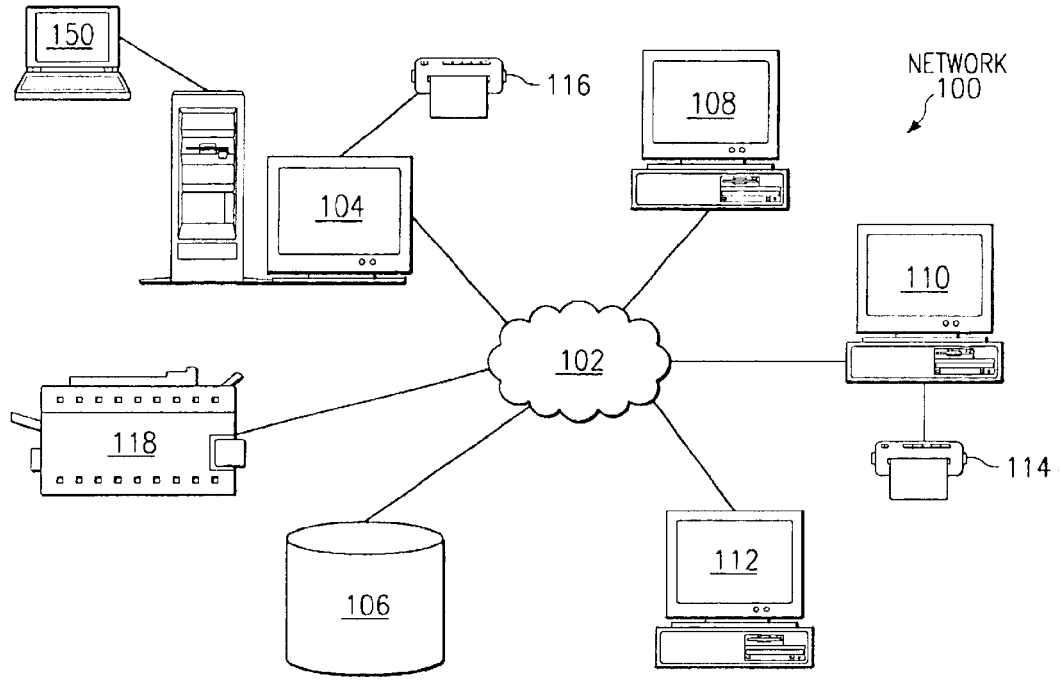
FIG. 1
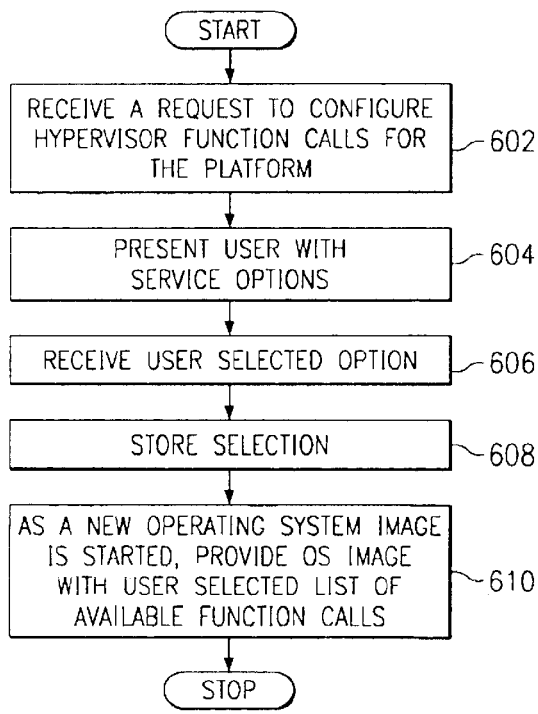
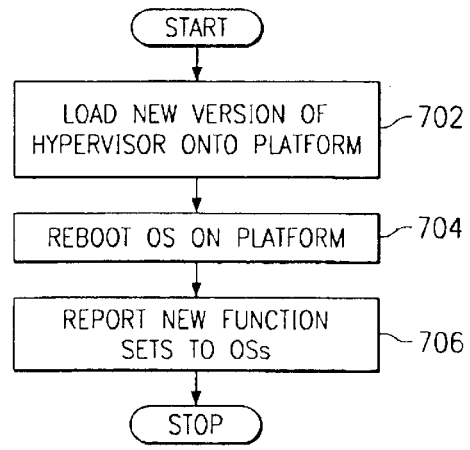

HYPERVISOR FUNCTION SET TABLE
500

| 520 FUNCTION SET NAME: | 530 FUNCTIONS: |
|---|---|
| 501 hcall-pft | H_REMOVE, H_ENTER, H_READ, H_CLEAR_MOD, H_CLEAR_REF, H_PROTECT |
| 502 hcall-tce | H_GET_TCE, H_PUT_TCE |
| 503 hcall-sprg0 | H_SET_SPRG0 |
| 504 hcall-dabr | H_SET_DABR |
| 505 hcall-copy | H_PAGE_INIT |
| 506 hcall-asr | H_SET_ASR, H_ASR_ON, H_ASR_OFF |
| 507 hcall-debug | H_LOGICAL_CI_LOAD, H_LOGICAL_CI_STORE, H_LOGICAL_CACHE_LOAD, H_LOGICAL_CACHE_STORE, H_LOGICAL_ICBI, H_LOGICAL_DCBF |
| 508 hcall-term | H_GET_TERM_CHAR, H_PUT_TERM_CHAR |
| 509 hcall-perf | H_REAL_TO_LOGICAL |
| 510 hcall-dump | H_HYPERVISOR_DATA |

FIG. 5

ХРЕРVISOR FUNCTION SETS

CROSS REFERENCE TO RELATED APPLICATIONS

The present application is related to co-pending U.S. patent application Ser. No. 09/589,663 entitled "HYPERVISOR AS A SET OF SERVICES" filed Jun. 8, 2000 and to U.S. patent application Ser. No. 09/589,665 entitled "DMA WINDOWING" filed Jun. 8, 2000 and issued Sep. 30, 2003 as U.S. Pat. No. 6,629,162. The content of the above-mentioned commonly assigned, co-pending U.S. patent applications are hereby incorporated herein by reference for all purposes.

BACKGROUND OF THE INVENTION

1. Technical Field

The present invention relates generally to the field of computer architecture and, more specifically, to methods and systems for managing resources among multiple operating system images within a logically partitioned data processing system.

2. Description of Related Art

A logical partitioning option (LPAR) within a data processing system (platform) allows multiple copies of a single operating system (OS) or multiple heterogeneous operating systems to be simultaneously run on a single data processing system platform. A partition, within which an operating system image runs, is assigned a non-overlapping sub-set of the platform's resources. These platform allocable resources include one or more architecturally distinct processors with their interrupt management area, regions of system memory, and I/O adapter bus slots. The partition's resources are represented by its own open firmware device tree to the OS image.

Each distinct OS or image of an OS running within the platform are protected from each other such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an OS's allocated resources are prevented from affecting the resources of any other image. Thus, each image of the OS (or each different OS) directly controls a distinct set of allocable resources within the platform.

One method that has been developed to create and maintain separation between the partitions within the data processing system is the use of a firmware component referred to as a hypervisor in the RS/6000 data processing system. The RS/6000 is a product and trademark of International Business Machines Corporation of Armonk, N.Y. This firmware component performs many functions and services for the various operating system images running within the logically partitioned data processing system.

As the software and hardware are improved over time, the library of services offered by the firmware component expands. The OS images must be made aware of these changes. Furthermore, as various options are selected by various implementations, or options are enabled or disabled by user policy, the OS images must also be made aware of these changes as well. Currently, there is no method for providing this information to the various OS images such that they are aware of which functions are available from the firmware component on a given platform at a given time. Thus, it is desirable to have a mechanism for making the OS images within a logically partitioned system aware of which functions are available to it through the firmware component.

SUMMARY OF THE INVENTION

The present invention provides a method, system, and apparatus for informing a plurality of operating systems, each assigned to a separate partition within a logically partitioned data processing system, of which functions, provided by a hypervisor for creating and enforcing separation of the logical partitions, are available for use by the operating systems. In a preferred embodiment, the hypervisor includes a plurality of function sets. Each function set includes a list of functions, that may be called by any one of the operating systems to perform tasks for the operating systems while maintaining separation between each of the logical partitions. The hypervisor informs each of the plurality of operating systems of an enabled function set. Functions identified within the enabled function set are enabled for use by each of the plurality of operating systems and functions not identified within the enabled function set are disabled for use by each of the plurality of operating systems.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 depicts a pictorial representation of a distributed data processing system in which the present invention may be implemented;

FIG. 5 depicts an exemplary hypervisor function set table in accordance with the present invention;

FIG. 6 depicts a flowchart illustrating an exemplary process for providing an operating system with a list of hypervisor function calls available on a platform in accordance with the present invention; and FIG. 7 depicts a flowchart illustrating an exemplary method for updating a list of function sets within a platform in accordance with the present invention.

DETAILED DESCRIPTION OF THE PREFERRED EMBODIMENT

Figure 2:
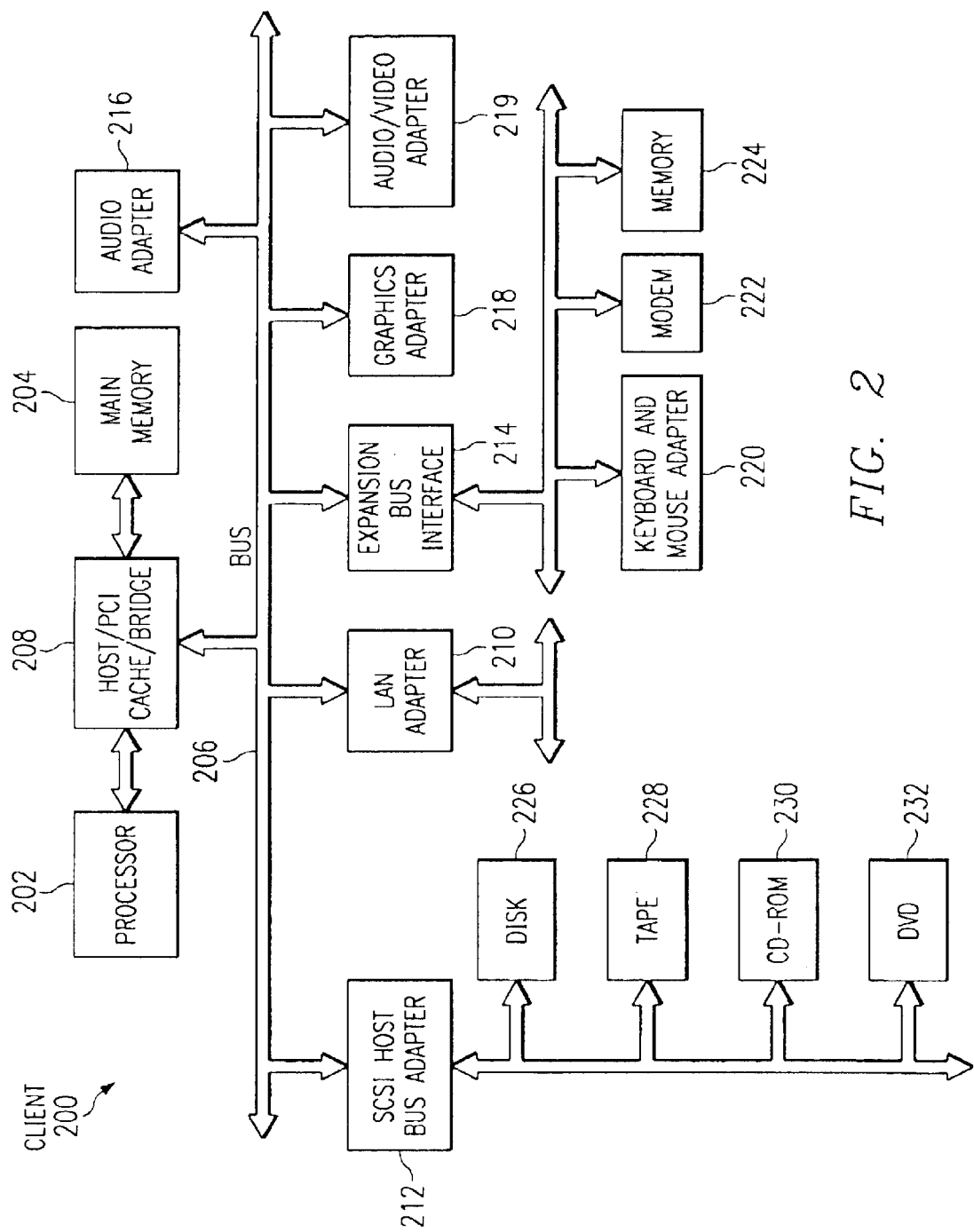
FIG. 2, a block diagram of a data processing system in accordance with the present invention is illustrated.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to hardware system console 150. Server 104 is also connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network that receives a program or other application from another computer coupled to the network. In the depicted example, server 104 is a logically partitioned platform and provides data, such as booth files, operating system images and applications, to clients 108–112. Hardware system console 150 may be a laptop computer and is used to display messages to an operator from each operating system image running on server 104, as well as to send input information, received from the operator, to server 104. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients, such as client 108 and client 112, do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network.

FIG. 1 is intended as an example and not as an architectural limitation for the processes of the present invention.

With reference now to FIG. 2, a block diagram of a data processing system in accordance with the present invention is illustrated. Data processing system 200 is an example of a hardware system console, such as hardware system console 150 depicted in FIG. 1. Data processing system 200 employs a peripheral component interconnect (PCI) local bus architecture. Although the depicted example employs a PCI bus, other bus architectures, such as Micro Channel and ISA, may be used. Processor 202 and main memory 204 are connected to PCI local bus 206 through PCI bridge 208. PCI bridge 208 may also include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. In the depicted example, SCSI host bus adapter 212 provides a connection for hard disk drive 226, tape drive 228, CD-ROM drive 230, and digital video disc read only memory drive (DVD-ROM) 232. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as OS/2, which is available from International Business Machines Corporation. "OS/2" is a trademark of International Business Machines Corporation. An object-oriented programming system, such as Java, may run in conjunction with the operating system, providing calls to the operating system from Java programs or applications executing on data processing system 200. Instructions for the operating system, the object-oriented operating system, and applications or programs are located on a storage device, such as hard disk drive 226, and may be loaded into main memory 204 for execution by processor 202.

Those of ordinary skill in the art will appreciate that the hardware in FIG. 2 may vary depending on the implementation. For example, other peripheral devices, such as optical disk drives and the like, may be used in addition to or in place of the hardware depicted in FIG. 2. The depicted example is not meant to imply architectural limitations with respect to the present invention. For example, the processes of the present invention may be applied to multiprocessor data processing systems.

Figure 3:
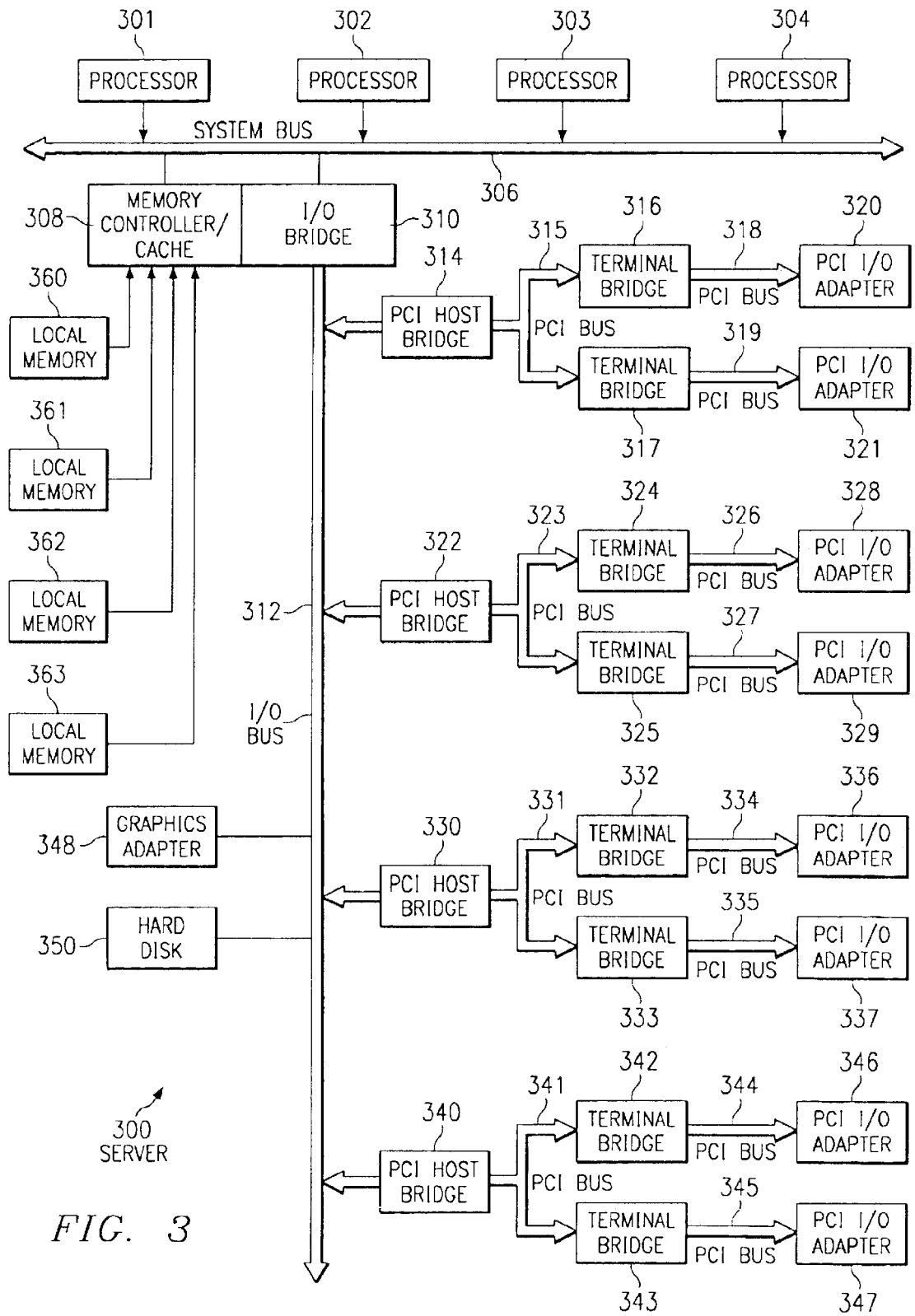
FIG. 3 depicts a block diagram of a data processing system, which may be implemented as a logically partitioned server, in accordance with the present invention.

With reference now to FIG. 3, a block diagram of a data processing system, which may be implemented as a logically partitioned server, such as server 104 in FIG. 1, is depicted in accordance with the present invention. Data processing system 300 may be a symmetric multiprocessor (SMP) system including a plurality of processors 301, 302, 303, and 304 connected to system bus 306. For example, data processing system 300 may be an IBM RS/6000, a product of International Business Machines Corporation in Armonk, N.Y. Alteratively, a single processor system may be employed. Also connected to system bus 306 is memory controller/cache 308, which provides an interface to a plurality of local memories 360–363. I/O bus bridge 310 is connected to system bus 306 and provides an interface to I/O bus 312. Memory controller/cache 308 and I/O bus bridge 310 may be integrated as depicted.

Data processing system 300 is a logically partitioned data processing system. Thus, data processing system 300 may have multiple heterogeneous operating systems (or multiple instances of a single operation system) running simultaneously. Each of these multiple operating systems may have any number of software programs executing within it. Data processing system 300 is logically partitioned such that different I/O adapters 320–321, 328–329, 336–337, and 346–347 may be assigned to different logical partitions.

Thus, for example, suppose data processing system 300 is divided into three logical partitions, P1, P2, and P3. Each of I/O adapters 320–321, 328–329, and 336–337, each of processors 301–304, and each of local memories 360–364 is assigned to one of the three partitions. For example, processor 301, memory 360, and I/O adapters 320, 328, and 329 may be assigned to logical partition P1; processors 302–303, memory 361, and I/O adapters 321 and 337 may be assigned to partition P2; and processor 304, memories 362–363, and I/O adapters 336 and 346–347 may be assigned to logical partition P3.

Each operating system executing within data processing system 300 is assigned to a different logical partition. Thus, each operating system executing within data processing system 300 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000™ operating system may be operating within logical partition P1. Windows 2000 is a product and trademark of Microsoft Corporation of Redmond, Wash.

Peripheral component interconnect (PCI) Host bridge 314 connected to I/O bus 312 provides an interface to PCI local bus 315. A number of Terminal Bridges 316–317 may be connected to PCI bus 315. Typical PCI bus implementations will support four Terminal Bridges for providing expansion slots or add-in connectors. Each of Terminal Bridges 316–317 is connected to a PCI/I/O Adapter 320–321 through a PCI Bus 318–319. Each I/O Adapter 320–321 provides an interface between data processing system 300 and input/output devices such as, for example, other network computers, which are clients to server 300. Only a single I/O adapter 320–321 may be connected to each terminal bridge 316–317. Each of terminal bridges 316–317 is configured to prevent the propagation of errors up into the PCI Host Bridge 314 and into higher levels of data processing system 300. By doing so, an error received by any of terminal bridges 316–317 is isolated from the shared buses 315 and 312 of the other I/O adapters 321, 328–329, and 336–337 that may be in different partitions. Therefore, an error occurring within an I/O device in one partition is not "seen" by the operating system of another partition. Thus, the integrity of the operating system in one partition is not effected by an error occurring in another logical partition. Without such isolation of errors, an error occurring within an I/O device of one partition may cause the operating systems or application programs of another partition to cease to operate or to cease to operate correctly.

Additional PCI host bridges 322, 330, and 340 provide interfaces for additional PCI buses 323, 331, and 341. Each of additional PCI buses 323, 331, and 341 are connected to a plurality of terminal bridges 324–325, 332–333, and 342–343, which are each connected to a PCI I/O adapter 328–329, 336–337, and 346–347 by a PCI bus 326–327, 334–335, and 344–345. Thus, additional I/O devices, such as, for example, modems or network adapters may be supported through each of PCI I/O adapters 328–329, 336–337, and 346–347. In this manner, server 300 allows connections to multiple network computers. A memory mapped graphics adapter 348 and hard disk 350 may also be connected to I/O bus 312 as depicted, either directly or indirectly. Hard disk 350 may be logically partitioned between various partitions without the need for additional hard disks. However, additional hard disks may be utilized if desired.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

Figure 4:
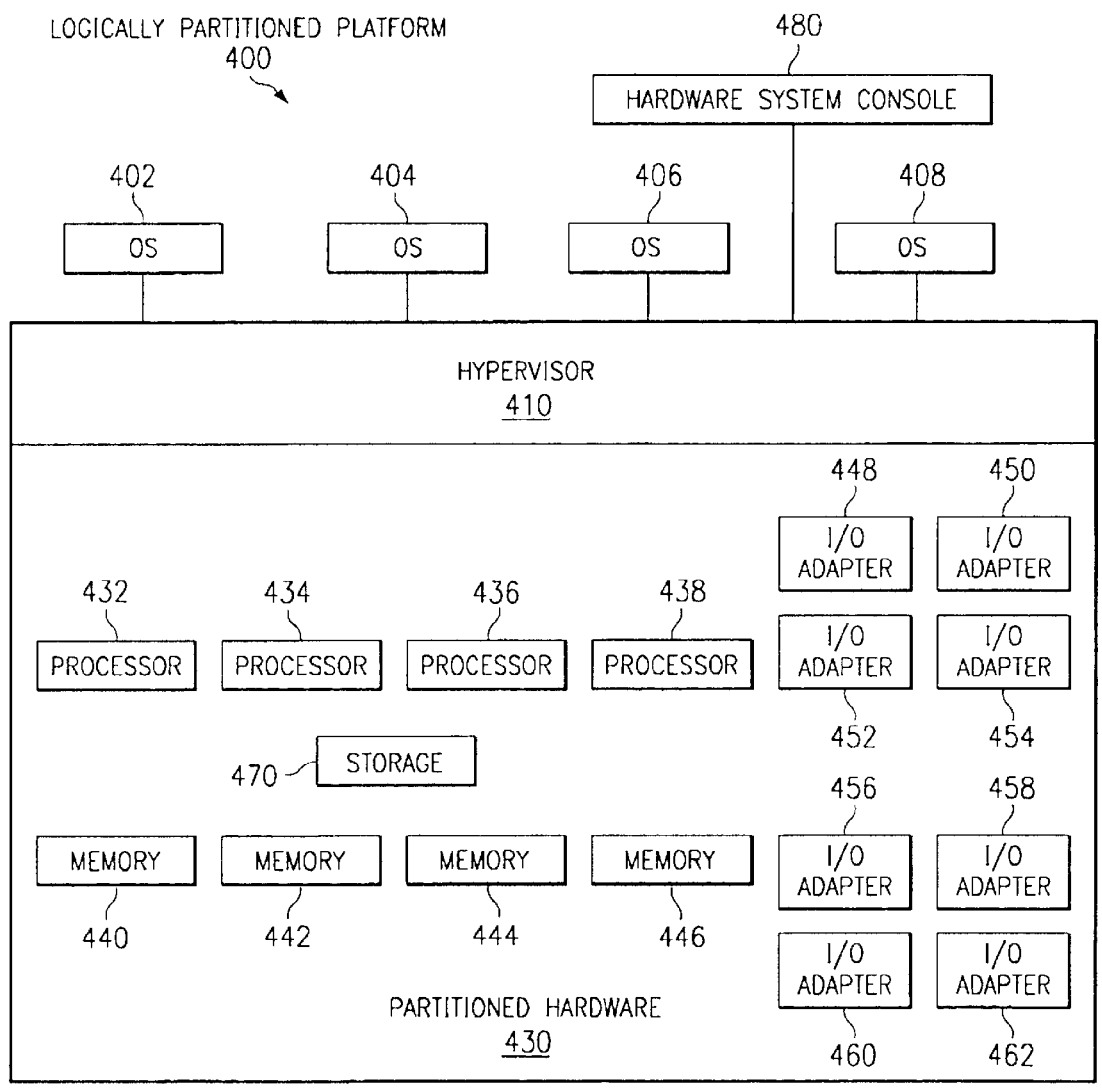
FIG. 4 depicts a block diagram of a logically partitioned platform in which the present invention may be implemented.

With reference now to FIG. 4, a block diagram of an exemplary logically partitioned platform is depicted in which the present invention may be implemented. The hardware in logically partitioned platform 500 may be implemented as, for example, server 300 in FIG. 3. Logically partitioned platform 400 includes partitioned hardware 430, hypervisor 410, and operating systems 402–408. Operating systems 402–408 may be multiple copies of a single operating system or multiple heterogeneous operating systems simultaneously run on platform 400.

Partitioned hardware 430 includes a plurality of processors 432–438, a plurality of system memory units 440–446, a plurality of input/output (I/O) adapters 448–462, and a storage unit 470. Each of the processors 442–448, memory units 440–446, and I/O adapters 448–462 may be assigned to one of multiple partitions within logically partitioned platform 400, each of which corresponds to one of operating systems 402–408.

Hypervisor 410, implemented as firmware, performs a number of functions and services for operating system images 402–408 to create and enforce the partitioning of logically partitioned platform 400. Firmware is "hard software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM).

Hypervisor 410 provides a secure direct memory access (DMA) window, per IOA, such as, for example, IOA 328 in FIG. 3, on a shared I/O bus, such as, for example, I/O bus 312 in FIG. 3, into the memory resources allocated to its associated OS image, such as, for example, OS image 402 in FIG. 4. In one embodiment, as implemented within an RS/6000 Platform Architecture, the hypervisor makes use of two existing hardware mechanisms. These hardware mechanisms are called the translation control entry (TCE) facility and the DMA range register facility of an EADS PCI to PCI bridge chip. In this embodiment, these two hardware mechanisms are placed under the control of the hypervisor.

When platform 400 is initialized, a disjoint range of I/O bus DMA addresses is assigned to each of IOAs 448–462 for the exclusive use of the respective one of IOAs 448–462 by hypervisor 410. Hypervisor 410 then configures the EADS range register (not shown) facility to enforce this exclusive use. Hypervisor 410 then communicates this allocation to the owning one of OS images 402–408. Hypervisor also initializes all entries in the IOA associated section of the TCE table to point to a reserved page per image that is owned by an OS image, such that unauthorized accesses to memory by one of OS images 402–408 will not corrupt or rob data from a neighboring one of OS images 402–408.

When an owning one of OS images 402–408 requests to map some of its memory for a DMA operation, it makes a call to the hypervisor 410 including parameters indicating the IOA, the memory address range, and the associated I/O bus DMA address range to be mapped. The hypervisor 410 checks that the IOA and the memory address range are allocated to the owning one of OS images 402–408. The hypervisor 410 also checks that the I/O bus DMA range is within the range allocated to the IOA. If these checks are passed, the hypervisor 410 performs the requested TCE mapping. If these checks are not passed, the hypervisor rejects the request.

Hypervisor 410 also may provide the OS images 402–408 running in multiple logical partitions each a virtual copy of a console and operator panel. The interface to the console is changed from an asynchronous teletype port device driver, as in the prior art, to a set of hypervisor firmware calls that emulate a port device driver. The hypervisor 410 encapsulates the data from the various OS images onto a message stream that is transferred to a computer 480, known as a hardware system console.

Hardware system console 480 is connected directly to logically partitioned platform 400 as illustrated in FIG. 4, or may be connected to logically partitioned platform through a network, such as, for example, network 102 in FIG. 1. Hardware system console 480 may be, for example, a desktop or laptop computer, and may be implemented as data processing system 200 in FIG. 2. Hardware system console 480 decodes the message stream and displays the information from the various OS images 402–408 in separate windows, at least one per OS image. Similarly, keyboard input information from the operator is packaged by the hardware system console, sent to logically partitioned platform 400 where it is decoded and delivered to the appropriate OS image via the hypervisor 410 emulated port device driver associated with the then active window on the hardware system console 480.

In order to prevent instruction fetch errors in hypervisor 410 from affecting OS images 402–408 and the rest of platform 400, two copies of the hypervisor 410 instructions are loaded into the memory of platform 400. A hypervisor 410 instruction fetch error occurs when one of the processors 432–438 is executing hypervisor 410 instructions and, after fetching the next instruction from one of memories 440–446 containing the hypervisor 410 instructions, detects that there is an error in the instruction. For example, the error could be the result of the instruction having been stored in a bad memory location, such that the instruction has become corrupted. Such an error in the instruction results in a machine check interrupt and the processor, on occurrence of such an interrupt, is unable to determine what instruction it should execute next. In the prior art, such an occurrence would result in either a need to reboot the entire system, thus interfering with the continuous operation of OS images 402–408, or extra redundancy bits for the entire system memory plus more complex encoding and decoding logic were utilized to recover from the error. Allowing for the necessity of rebooting the entire system could result in the loss of data for applications executing in one of OS images 402–408, which is unacceptable and should be avoided if at all possible. Utilizing the extra redundancy bits along with more complex encoding and decoding logic impairs the speed and performance of platform 400.

Hypervisor 410 also provides other functions and services to each of operating systems 402–408. Some of these functions and services are not optional, such as the virtual console and operator panel described above. However, other services provided by the hypervisor 410 may be optional, allowing the platform administrator to make policy decisions with regard to options, that while generally useful, the administrator may wish to disable due to, for example, security concerns. Alternatively, optional features allow for expanded functionality over time, allowing new features to be introduced on new machines while the same operating system seamlessly runs on old machines without the new function.

Below, in Table 1, is an exemplary table of function sets and their mandatory/optional status. The hcall-pft functions manipulate the page frame table for processor virtual address translation. The hcall-tce function set manipulates the Direct Memory Access (DMA) facilities used by the IO devices as described in U.S. patent application Ser. No. 09/589,665 (IBM Docket No. AUS990941US1) entitled "DMA Windowing" filed on Jun. 8, 2000, and issued Sep. 30, 2003 as U.S. Pat. No. 6,629,162. The hcall sprg0, hcall-dabr and hcall-asr functions manipulate internal processor registers which may themselves be optional. The hcall-debug and hcall-perf function sets provide services needed by debuggers and performance monitor routines. The hcall-term function set provides the function described in the virtual terminal invention disclosure. Finally hcall-dump provides facilities to allow an OS to do a dump of the Hypervisor data areas for platform debug.

TABLE 1

| Mandatory | Function Set |
| --- | --- |
| Yes | hcall-pft |
| Yes | hcall-tce |
| Yes | hcall-sprg0 |
| No - Only if DABR Exists | hcall-dabr |
| Yes | hcall-copy |
| No - Only if Istar Processors | hcall-asr |
| Yes | hcall-debug |
| Yes | hcall-term |
| Yes | hcall-perf |
| No - Only if enabled by HSC (default disabled) | hcall-dump |

To make certain features available, hypervisor 410 provides a list of function sets. Each function set includes one or more hypervisor function cells. Once a function set has been selected by platform 400, all function calls contained within the function set must be made available to each of OSs 402–408.

In one embodiment, the OS is made aware of the services in the function set by being passed a parameter called a "property" in a structure that it receives at boot time. This property contains the list of the function set names, outlined above, that are available for it to use. The OS is expected to only make those requests that are specified in the property list, however, if the OS should make some other call that is not specified as being supported, the hypervisor will return an error message to the OS.

As a new service or function call for hypervisor 410 is provided, a system architect adds these new services and function calls to a new function set to include the newly available services and function calls. This is typically performed by the vendor prior to delivering a new updated hypervisor version to a platform.

Those of ordinary skill in the art will appreciate that the hardware and software depicted in FIG. 4 may vary. For example, more or fewer processors and/or more or fewer operating system images may be used than those depicted in FIG. 4. The depicted example is not meant to imply architectural limitations with respect to the present invention.

With reference now to FIG. 5, an exemplary hypervisor function set table is depicted in accordance with the present invention. Hypervisor function set table 500 includes a plurality of function sets 501–510 under a heading of "function set names" 520. Each of function sets 501–510 contains a list of hypervisor function calls under the heading of "functions" 530 available within that particular one of function sets 501–510.

With reference now to FIG. 6, a flowchart illustrating an exemplary process for providing an operating system with a list of hypervisor function calls available on a platform is depicted in accordance with the present invention. To begin, the hypervisor, such as hypervisor 410 in FIG. 4, receives a request to configure the hypervisor function calls for the platform, such as, for example, platform 400 (step 602). The hypervisor presents the user (typically the system administrator), such as through a window display on hardware system console 480 in FIG. 4, with a list of function set options available (step 604). The available function sets may be Function Sets 501–510 depicted in FIG. 5. In one embodiment, the displayed list may contain only the function set names with additional information about each function set available through a selectable hyperlink. In another embodiment, the list may contain the name of each function set along with information detailing the differences between the function set, but not displaying each function call available with each particular function set. In yet another embodiment, the entire function call list for each function set may be displayed to the user.

Once the user has selected a function set for use with the platform, the hypervisor receives the user selected option (step 606) and stores the selection (step 608) in a storage device within the platform, such as, for example, hard disk 350 in FIG. 3. Each time a new operating system image is started on the platform, the hypervisor provides the newly started OS image with the user selected function set, which includes a list of available hypervisor function calls enabled for the OS image (step 610).

With reference now to FIG. 7, a flowchart illustrating an exemplary method for updating a list of function sets within a platform is depicted in accordance with the present invention. To update a list of function sets with newly introduced function sets, a new version of the hypervisor firmware is loaded onto the platform (step 702). The platform is then rebooted (step 704) and the hypervisor reports any new function sets it may support to the OSs on this OS boot (step 706). An old level of an OS that does not understand how to use the new function set will ignore it and use the same subset of the hypervisor's functions that it did prior to the update. A newer level of OS that had been capable of using the new function but had been restricted by a lack of hypervisor firmware support in the old level of the hypervisor will, after the update, see the availability of the new functions and proceed to use them.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A logically partitioned data processing system, comprising:

a plurality of operating systems, each assigned to a separate one of a plurality of logical partitions;

a hypervisor for creating and enforcing separation between each of the plurality of logical partitions; wherein the hypervisor includes a plurality of selectable function sets, each function set including a list of hypervisor function calls that are provided by the hypervisor which may be called by any one of the plurality of operating systems to get said hypervisor to perform tasks for the calling one of the plurality of operating systems while maintaining separation between each of the plurality of logical partitions, said hypervisor receiving a selection of one of said plurality of function sets;

said selected one of said plurality of function sets being enabled;

the hypervisor informs each of the plurality of operating systems of an enabled function set, function calls included within the enabled function set being enabled for use by each of the plurality of operating systems and function calls not included within the enabled function set being disabled for use by each of the plurality of operating systems.

2. The logically partitioned data processing system as recited in claim 1, wherein the enabled function set from the plurality of function sets may be changed such that a different one of the plurality of function sets becomes the enabled function set.

3. The logically partitioned data processing system as recited in claim 1, wherein additional function sets may be added to the plurality of function sets as additional function calls are added to the plurality of function calls provided by the hypervisor.

4. The logically partitioned data processing system as recited in claim 1, wherein the hypervisor is implemented as firmware.

5. The logically partitioned data processing system as recited in claim 1, wherein each of the plurality of function sets comprises a different group of the plurality of function calls.

6. The logically partitioned data processing system as recited in claim 1, wherein optional function calls are omitted from at least one of the plurality of function sets.

7. A method of identifying hypervisor function calls that are currently available for execution by a hypervisor in a logically partitioned data processing system, the method comprising:

assigning each one of a plurality of operating systems to a separate one of a plurality of logical partitions;

creating and enforcing, by said hypervisor, separation between each of the plurality of logical partitions;

providing, by said hypervisor, a plurality of selectable function sets, each function set including a list of function calls that are provided by the hypervisor that can be called by any one of the plurality of operating systems to get said hypervisor to perform tasks for the calling one of the plurality of operating systems while maintaining separation between each of the plurality of logical partitions;

receiving, by said hypervisor, a selection of one of said plurality of function sets;

enabling said selected one of said plurality of function sets;

informing, by said hypervisor, each one of the plurality of operating systems of an enabled function set, function calls included within the enabled function set being enabled for use by each one of the plurality of operating systems and function calls not included within the enabled function set being disabled for use by each one of the plurality of operating systems, wherein hypervisor function calls that are currently available for execution are identified.

8. The method as recited in claim 7, further comprising:

responsive to loading a new version of the hypervisor, the new version of the hypervisor containing additional function calls, reporting the additional function calls to each operating system upon re-initialization.

9. The method as recited in claim 8, wherein the re-initialization of each operating system is performed by a reboot.

10. The method as recited in claim 7, wherein the operating system image is initialized by booting.

11. The method as recited in claim 7, wherein the hypervisor is implemented as firmware.

12. The method according to claim 7, further comprising:

receiving a selection of said one of said plurality of function sets from a platform included within said data processing system.

13. The method according to claim 7, further comprising:

during booting of each one of said plurality of operating systems, passing a parameter to each one of said plurality of operating systems that identifies said selected one of said plurality of function sets.

14. The method according to claim 7, further comprising:

receiving said selection of said one of said plurality of function sets from a user.

15. A computer program product in a computer readable media for use in a data processing system for identifying hypervisor function calls that are currently available for execution by a hypervisor in a logically partitioned data processing system, the computer program product comprising:

instructions for assigning each one of a plurality of operating systems to a separate one of a plurality of logical partitions;

instructions for creating and enforcing, by said hypervisor, separation between each of the plurality of logical partitions;

instructions for providing, by said hypervisor, a plurality of selectable function sets, each function set including a list of function calls that are provided by the hypervisor that can be called by any one of the plurality of operating systems to get said hypervisor to perform tasks for the calling one of the plurality of operating systems while maintaining separation between each of the plurality of logical partitions;

instructions for receiving, within said hypervisor, a selection of one of said plurality of function sets;

instructions for enabling said selected one of said plurality of function sets;

instructions for informing, by said hypervisor, each one of the plurality of operating systems of an enabled function set, function calls included within the enabled function set being enabled for use by each one of the plurality of operating systems and function calls not included within the enabled function set being disabled for use by each one of the operating systems, wherein hypervisor function calls that are currently available for execution are identified.

16. The computer program product as recited in claim 15, further comprising:

instructions, responsive to loading a new version of the hypervisor, the new version of the hypervisor containing additional function calls, for reporting the additional function calls to each operating system upon re-initialization.

17. The computer program product as recited in claim 16, wherein the re-initialization of each operating system is performed by a reboot.

18. The computer program product as recited in claim 15, wherein the operating system image is initialized by booting.

19. The computer program product as recited in claim 15, wherein the hypervisor is implemented as firmware.

20. A system for identifying hypervisor function calls that are currently available for execution by a hypervisor in a logically partitioned data processing system, the system comprising:

means for assigning each one of a plurality of operating systems to a separate one of a plurality of logical partitions;

means for creating and enforcing, by said hypervisor, separation between each of the plurality of logical partitions;

means for providing, by said hypervisor, a plurality of selectable function sets, each function set including a list of function calls that are provided by the hypervisor that can be called by any one of the plurality of operating systems to perform tasks for the calling one of the plurality of operating systems while maintaining separation between each of the plurality of logical partitions;

means for receiving a selection of one of said plurality of function sets;

means for enabling said selected one of said plurality of function sets;

means for informing, by said hypervisor, each one of the plurality of operating systems of an enabled function set, function calls included within the enabled function set being enabled for use by each one of the plurality of operating systems and function calls not included within the enabled function set being disabled for use by each one of the operating systems, wherein hypervisor function calls that are currently available for execution are identified.

21. The system as recited in claim 20, further comprising:

means, responsive to loading a new version of the hypervisor, the new version of the hypervisor containing additional function calls, for reporting the additional function calls to each operating system upon re-initialization.

22. The system as recited in claim 21, wherein the re-initialization of each operating system is performed by a reboot.

23. The system as recited in claim 20, wherein the operating system image is initialized by booting.

24. The system as recited in claim 20, wherein the hypervisor is implemented as firmware.

* * * * *